United States Patent [19]

Herbert et al.

[11] Patent Number: 5,107,924

[45] Date of Patent: Apr. 28, 1992

[54] PLASTIC RADIATOR TANK FOR HEAT EXCHANGERS

[75] Inventors: Damsohn Herbert, Aichwald; Walter Wolf, Oppenweiler, both of Fed. Rep. of Germany

[73] Assignee: Behr GmbH & Co., Fed. Rep. of Germany

[21] Appl. No.: 656,810

[22] Filed: Feb. 19, 1991

[30] Foreign Application Priority Data

Mar. 2, 1990 [DE] Fed. Rep. of Germany ... 9002438[U]

[51] Int. Cl.$^5$ .............................. F28F 9/02
[52] U.S. Cl. .................. 165/173; 165/149; 165/906
[58] Field of Search .......... 165/173, 905, 906, 149; 285/137.1, 243, 253

[56] References Cited

U.S. PATENT DOCUMENTS

| 767,893 | 8/1904 | Jewell | 285/243 |
| 4,492,267 | 1/1985 | Cadars | 165/104.32 |
| 4,678,026 | 7/1987 | Lenz et al. | 165/67 |
| 4,709,757 | 12/1987 | Bly | 165/173 |
| 4,940,086 | 7/1990 | Stay | 165/173 |

FOREIGN PATENT DOCUMENTS

| 317255 | 9/1951 | Fed. Rep. of Germany . |
| 7327463 | 10/1973 | Fed. Rep. of Germany . |
| 2166518 | 6/1974 | Fed. Rep. of Germany . |
| 3619267 | 10/1987 | Fed. Rep. of Germany . |
| 3820623 | 12/1989 | Fed. Rep. of Germany . |
| 2249299 | 5/1975 | France . |
| 61-211693 | 9/1986 | Japan | 165/906 |

Primary Examiner—Allen J. Flanigan
Attorney, Agent, or Firm—Evenson, Wands, Edwards, Lenahan & McKeown

[57] ABSTRACT

A plastic radiator tank for heat exchangers of internal-combustion engines, particularly for radiators of commercial vehicles, having at least one connection tube for a heat exchange medium. The connection tube has an interior wall and includes a reinforcement on the interior wall. The reinforcement comprises webs which project toward the inside of the connection tube from the interior wall.

17 Claims, 6 Drawing Sheets

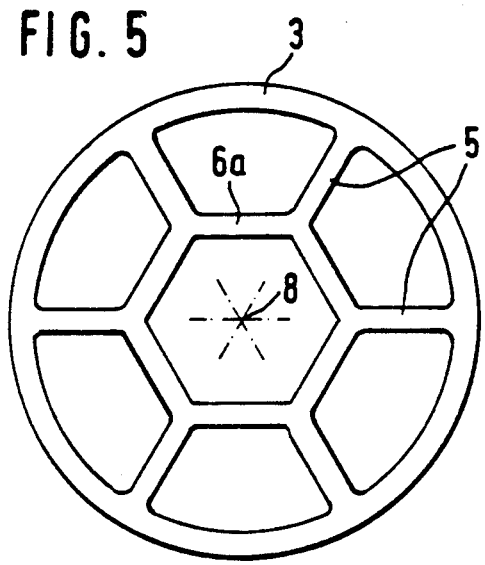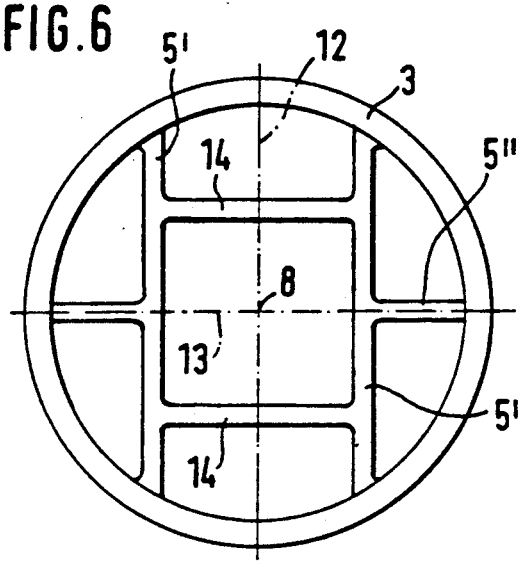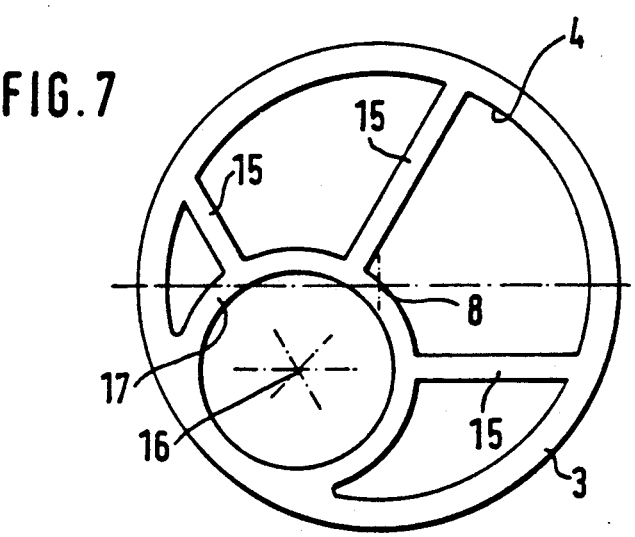

PLASTIC RADIATOR TANK FOR HEAT EXCHANGERS

BACKGROUND AND SUMMARY OF THE INVENTION

The present invention relates to a plastic radiator tank for heat exchangers of internal-combustion engines, particularly for radiators of commercial vehicles, which is equipped with at least one connection tube for a heat exchange medium and which is provided with a reinforcement on its interior side.

Plastic radiator tanks of the above type are known, for example, for the radiators of the internal-combustion engine of commercial vehicles. The amount of coolant which flows through the finned-tube block of the radiators of such engines is large because the engine output to be cooled is also considerable. This also results in relatively large tanks for the radiators. The manufacturing of the tanks of a plastic material, which takes place for reasons of weight, in the case of such large engines, requires the arrangement of reinforcing parts in all areas of the tank which are subjected to high forces. In addition to the corner areas, where the side parts are fastened, this also applies to the coolant connection tube on which the hose connection must be mounted in a sealed-off manner. For this reason, it is also known to press metallic supporting sleeves into the connection tubes. However, this requires an additional operation and is therefore relatively expensive.

It is an object of the invention to provide a plastic radiator tank of the above-described type in which the subsequent pressing-in of metal sleeves becomes superfluous but that nevertheless has connection tubes with the required stiffness.

This and other objects are achieved by the present invention by providing a plastic radiator tank in which the reinforcement is formed by webs which, starting out from the interior wall, project toward the inside and which in certain embodiments are injection-molded on in one piece.

The present invention permits in a simple manner for the connection tube to be constructed correspondingly stiff already as a result of its manufacturing. Also in embodiments of the invention, it becomes possible to design the free cross-section in such a manner that the necessary coolant quantity can flow in or out. The subsequent mounting of add-on parts for the reinforcement of the connection tube is then superfluous.

There are various embodiments of web constructions which can be injection molded-on in one piece.

One embodiment comprises arranging the webs evenly distributed on the inner circumference of the connecting tube, with these webs being in the form of reinforcing ribs which extend in the flow direction.

In another advantageous embodiment, the webs are flow guiding walls which are connected with one another and preferably abut on and are connected with a hollow center piece. This results in a type of double-walled construction which is particularly stiff. It has the advantage that it is easy to manufacture and that, for a tightness test of the finished radiator, a sealing stopper can be inserted and fastened which has approximately the same structure as the core of the injection molding die that was used beforehand during the manufacturing.

It is also very advantageous, according to embodiments of the invention, to provide for circular connection tubes with the center piece being a circular-cylindrical pipe piece arranged concentrically in the free cross-section and the edges of the webs, which point toward the outside in the connection tube, being slightly set back from the front edge of the connection tube so that a circular-cylindrical sealing surface is formed which can be utilized for having a sealing stopper for the tightness test rest against it.

In other embodiments of the invention, it is advantageous, particularly in view of a required deflection of the flow through the connection tube, to arrange the center piece eccentrically in the connection tube. In certain embodiments, the webs extend radially, in the manner of spokes, or spirally, from the center of the connection tube toward the outside. However, in other embodiments, the webs are part of a honeycomb-shaped reinforcement which, in the manner of a grid, is arranged inside the free cross-section of the connection tube. For manufacturing reasons, it should be observed in all cases that the free cross-section between the webs or the center piece has walls which extend in parallel to one another, or better, widen slightly conically toward the outside so that the cores for the mold for the manufacturing of the radiator tank can be removed easily.

Other objects, advantages and novel features of the present invention will become apparent from the following detailed description of the invention when considered in conjunction with the accompanying drawings.

BRIEF DESCRIPTION OF THE DRAWINGS

FIGS. 5, 6, and 7 are frontal views of connection tubes similar to FIG. 3, in each case viewed in the direction X, but with different embodiments of the interior reinforcement.

DETAILED DESCRIPTION OF THE DRAWINGS

Figure 1:
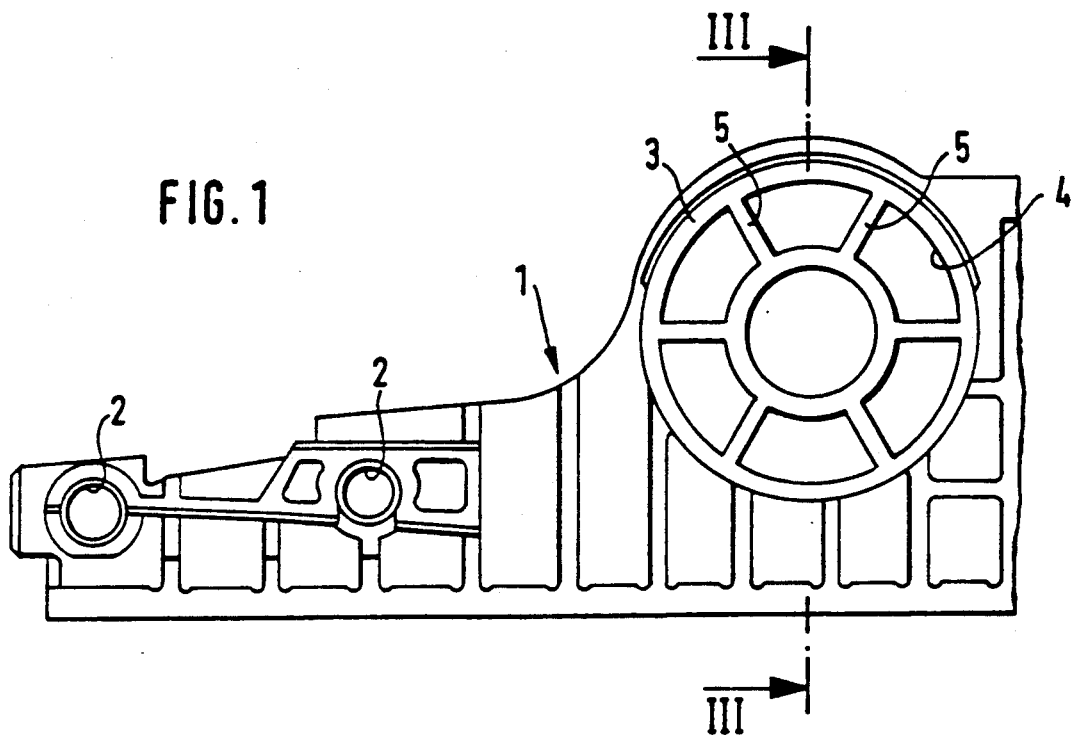
FIG. 1 is a schematic partial frontal view of the area of the connection tube for the coolant inflow of a plastic radiator tank for the radiator of a motor vehicle internal-combustion engine constructed according to an embodiment of the present invention.
Figure 2:
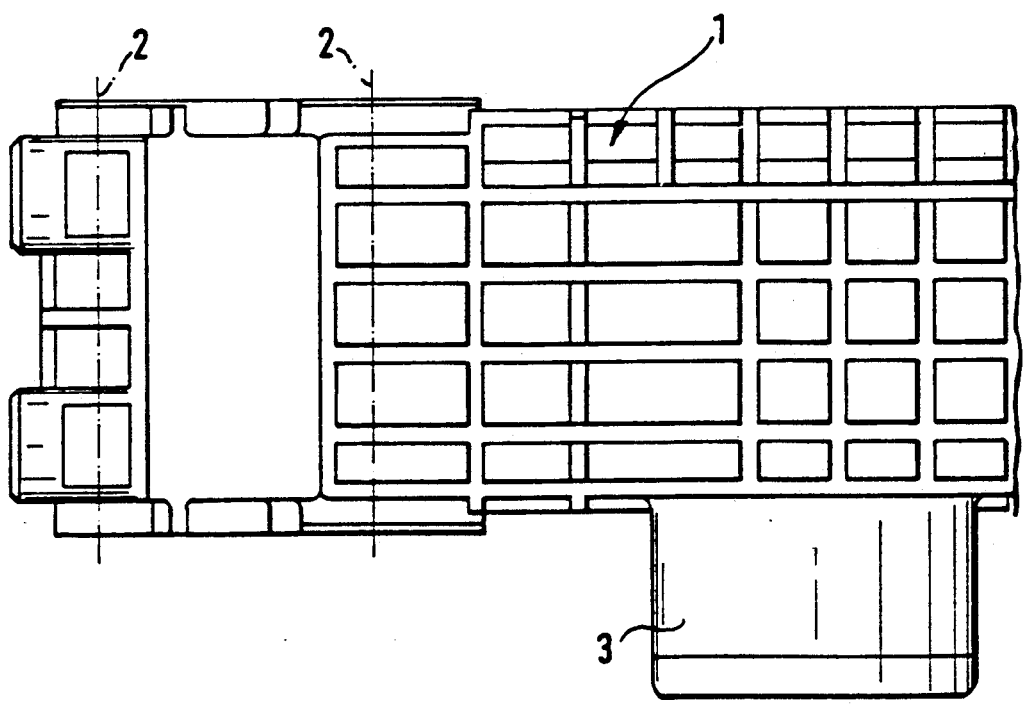
FIG. 2 is a top view of the radiator tank of FIG. 1.
Figure 3:
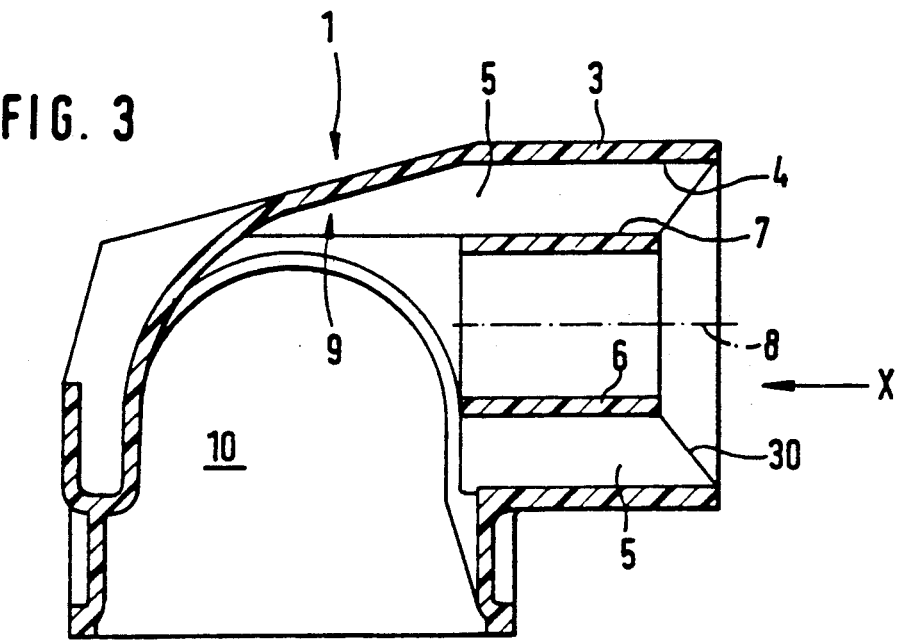
FIG. 3 is a sectional view of the radiator tank of FIG. 1 along the intersecting line III—III.

FIGS. 1 to 3 show a radiator tank made of plastic for a radiator, not shown in detail, of an internal-combustion engine for a commercial vehicle. In a known and therefore not illustrated manner, a finned tube block is mounted on the engine and is held together in the manner of a frame by the illustrated radiator tank 1 and a second radiator tank which is arranged on the opposite side and has a similar construction and by lateral parts. The lateral parts reach over the radiator tank 1 by means of brackets, in each case, on the front side. The lateral parts are connected with the radiator tanks 1 and the second radiator tank by means of pins which are fitted through the bores 2 of the radiator tank 1. Similar bores are disposed on the right side of the radiator tank, which is not shown.

The flow of the coolant into the radiator tank and thus to the finned-tube block takes place by way of the connection tube 3 to which, for example, a hose connection is tightly fastened by a pipe clamp in a manner not shown in detail. In order to provide the required stiffness to this connection tube 3, which must be injection-molded from plastic material but the wall thickness of which, for manufacturing reasons, may not exceed a specific thickness, it is provided to arrange webs 5 which project from the interior wall 4 toward the inside into the free cross-section and which, in the case of the shown embodiment with a circular connection tube 3, abut on a centrically arranged pipe piece 6 with a circular cross-section. The webs 5 and the pipe piece 6 are injection-molded in one piece to the connection tube 3 during the manufacturing of the radiator tank.

Figure 4:
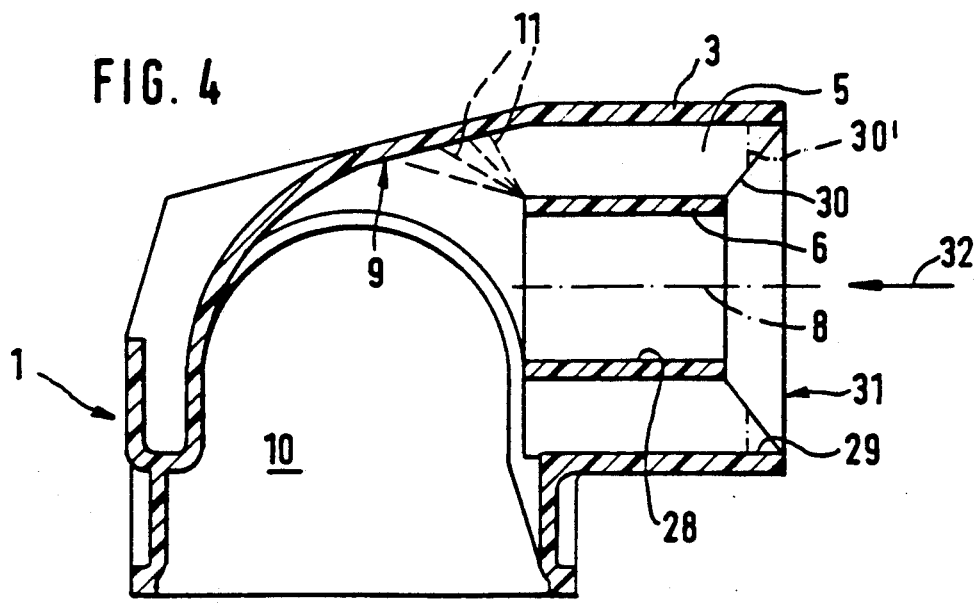
FIG. 4 is a sectional view similar to FIG. 3 constructed according to another embodiment of the connection tube.
Figure 8:
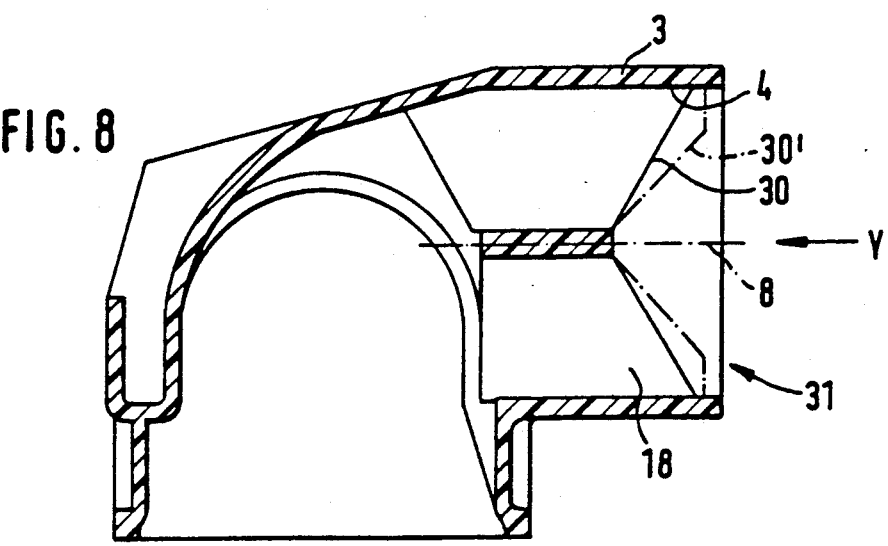
FIG. 8 is a sectional representation similar to FIG. 3 or 4, but illustrating another embodiment of the present invention.

FIG. 3 shows that the interior wall 4 of the connection tube 3 extends approximately in parallel to the exterior wall 7 of the pipe piece 6. Likewise, the webs 5 extend in planes which extend through the center axis 8 of the connection tube 3. The connection tube 3 can therefore be manufactured by using a corresponding core. The two webs that are disposed on the top in FIGS. 1 and 3 extend into an area 9 of the connection tube which is above the interior 10 of the radiator tank. FIG. 4 illustrates that this is not absolutely necessary but that the end of the webs 5 may end in front of the deflecting area, as indicated by interrupted lines 11. A dash-dotted line indicates the front edge 30' of the webs 5 which, in the flow direction 32 of the coolant, is slightly set back with respect to the front edge 31 of the connection tube 3 so that a circular-cylindrical surface 29 is formed. It is also possible to set back the front edge 30' so far that it is aligned with the front edge of the pipe piece 6.

FIGS. 1 and 3 indicate that the connection tube 3 manufactured in this manner is very stable because of its double-walled construction. The subsequent inserting of a metal sleeve becomes superfluous. The free cross-section of the connection tube 3 may then be selected such that it is large enough for letting the required amount of coolant flow through without any pressure losses. The illustrated reinforcement by means of the ribs and the pipe piece 6 may also contribute to leading the flowing-in coolant, if possible, into the radiator tank or back out without any turbulence.

FIGS. 5 and 6 illustrate cross-sectional shapes of the reinforcement of the connection tube 3 which, in the longitudinal sectional view, correspond approximately to the sectional shapes illustrated in FIGS. 3 and 4. In contrast to the embodiment according to FIG. 1, however, FIG. 5 does not have a circular-cylindrical pipe piece but a pipe piece 6a which is constructed as a polygon designed in the shape of a uniform hexagon. FIG. 6, on the other hand, shows an embodiment in which the webs 5', 5" do not extend radially like the webs 5 of FIGS. 1 to 5 but in which only the webs 5" extend radially toward the center of the axis 8, and the webs 5' each extend at a distance from a plane 12 which stands vertically on a plane 13 extending through the center axis 8, the two webs 5" being disposed in the plane 13. The two webs 5' which are therefore disposed eccentrically, together with transverse webs 14, form a center piece which is square in its cross-section, is constructed in the manner of a parallelipiped block and the center axis of which is axis 8.

FIG. 7 is another embodiment of the present invention in which the web and hollow-body arrangement that is provided for the reinforcement is arranged asymmetrically with respect to the center axis 8 of the circular-cylindrical connection tube 3. Here, webs 15 extend centrally from the direction of an axis 16 which extends in parallel to the center axis 8 but which is disposed eccentrically in the circular cross-section of the connection tube 3. A circular-cylindrical wall forms a pipe piece 17 which surrounds the axis 16 concentrically and, from the direction of which, in the manner described above, the webs 15 extend toward the outside to the interior wall 4 of the connection tube. Such reinforcements can be used, for example, for dividing up the amounts of coolant flow in the connection tube. This is done in order to deflect the larger part of the coolant flow in the area 9 of the deflecting wall, and admix the part guided through the pipe piece 17 only later to the deflected flow. This is done, for example, when the eccentric axis 16 is arranged correspondingly.

Figure 9:
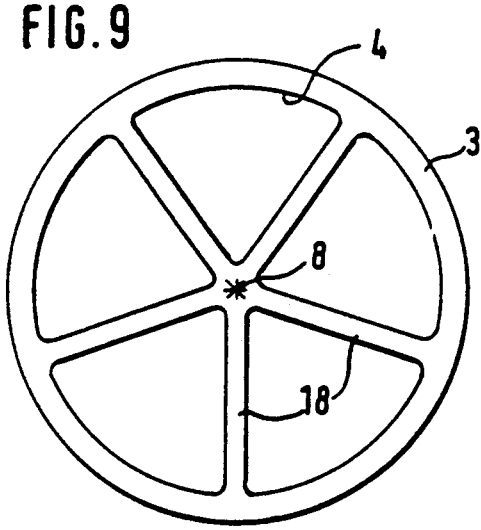
FIGS. 9, 10, 11 and 12 are frontal views of connection tubes similar to FIG. 8 viewed in the direction Y, illustrating alternative embodiments of the reinforcement.
Figure 10:
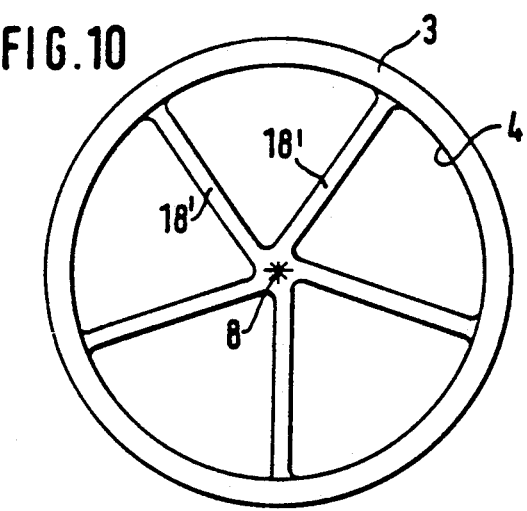
Figure 11:
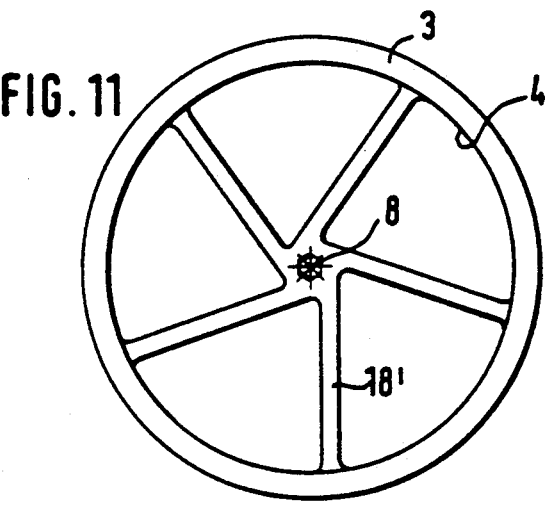

FIGS. 8 to 12 show embodiments of the cross-sectional reinforcement in which no circular-cylindrical pipe pieces, not even in an eccentrically offset manner, are provided. In FIGS. 9 to 12, the reinforcing webs 18, 18' and 19 all start out from the interior wall 4 of the connection tube 3 and extend to the center axis 8. In FIG. 9, the webs 18 each extend radially to the axis 8, and five webs are provided. In FIGS. 10 and 11, the webs 18' do not extend precisely radially, but in the area of the center axis 8, with their center planes, are tangent on a circle, which is not shown and which concentrically surrounds the axis 8 and the diameter of which in the embodiment of FIG. 11 is larger than in FIG. 10. This results in a spoke-type course of the webs 18'.

Figure 12:
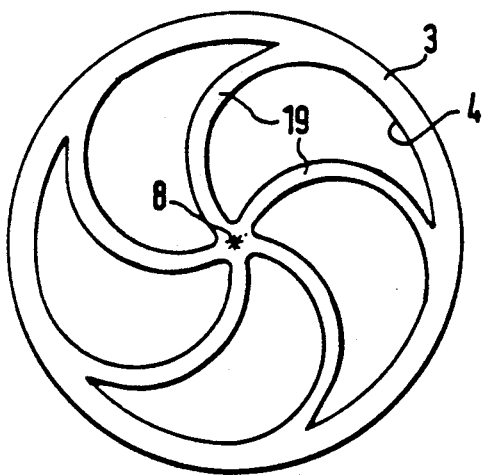

FIG. 12 shows a reinforcing profile in which also five webs 19 each extend from the interior wall 4 of the connection tube 3 toward the interior. However, the webs 19 spiral to the center axis 8. In the illustrated embodiment, the webs 19 lead into the axis 8 by means of a radially extending area, and change into the interior wall 4 of the connection tube 3 but with an end which extends approximately tangentially in parallel to this interior wall 4. In between, the curvature of the webs 19 corresponds to a circular arc with a radius which corresponds approximately to half the circle radius which is formed by the interior wall 4.

Figure 13:
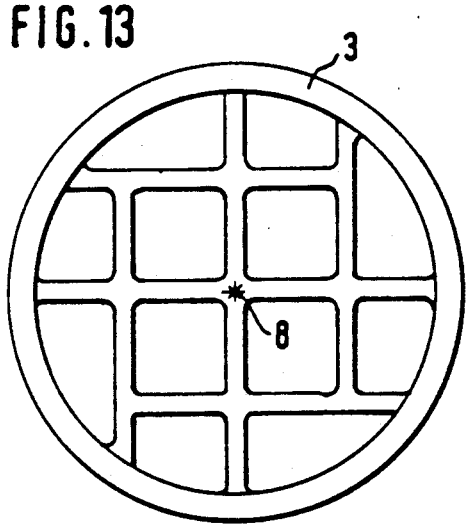
FIGS. 13, 14, 15, 16 and 17 are frontal views similar to FIGS. 9-12, but using a honeycomb-shaped construction of the reinforcement inside the connection tube.
Figure 15:
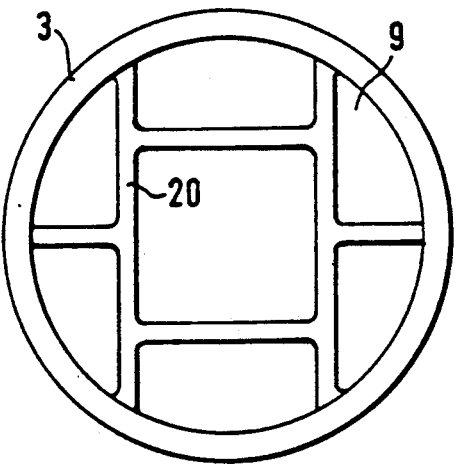
Figure 14:
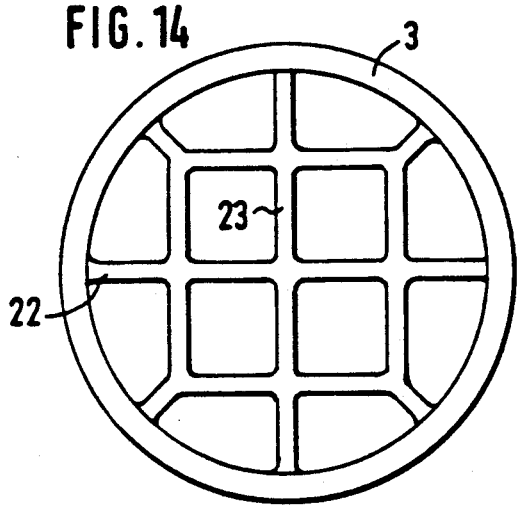
Figure 16:
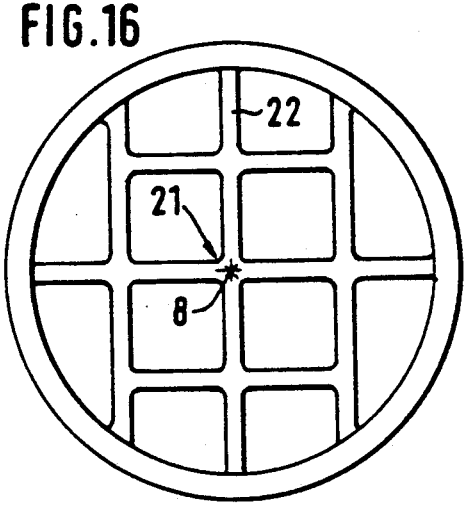
Figure 17:
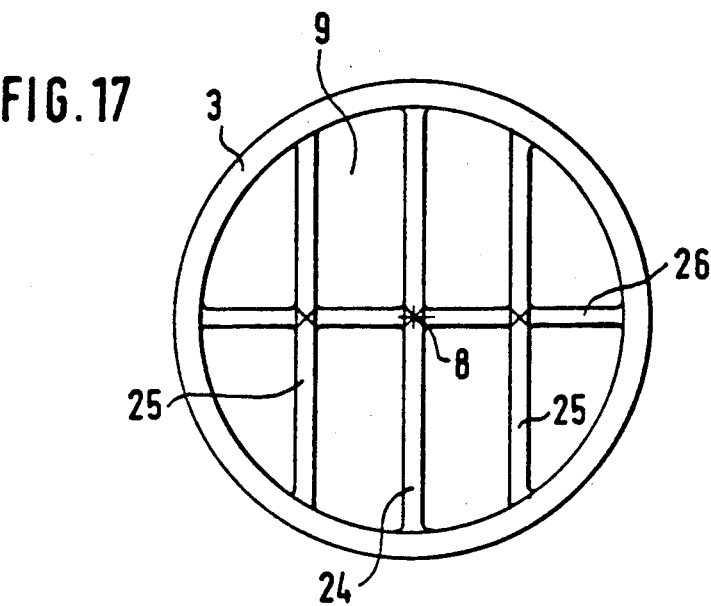

FIGS. 13 to 17 show embodiments in which, similar to FIG. 6, a honeycomb-type reinforcement of the free cross-section of the connection tube 3 is used. In FIG. 15, an approximately square center piece 20 is also formed, the cross-section of which is free of intermediate webs. In contrast, the embodiments of FIGS. 13, 14 and 16 also divide this free cross-section again. The honeycomb-type reinforcement 21 of FIG. 16 is symmetrically constructed with respect to a transverse plane 22 extending through the center axis 8. The cross-sectional reinforcement of FIG. 14 is symmetrical to the two planes 2 and 23. FIG. 13 shows another embodiment, and the embodiment of FIG. 17 has a profile which is symmetrical with respect to the center plane 24 and which is equipped with parallel partitions 25 which extend vertically with respect to the area 9 and are connected by means of a transverse wall 26 which extends through the center axis 8 and is disposed vertically with respect to the walls 25.

Figure 18:
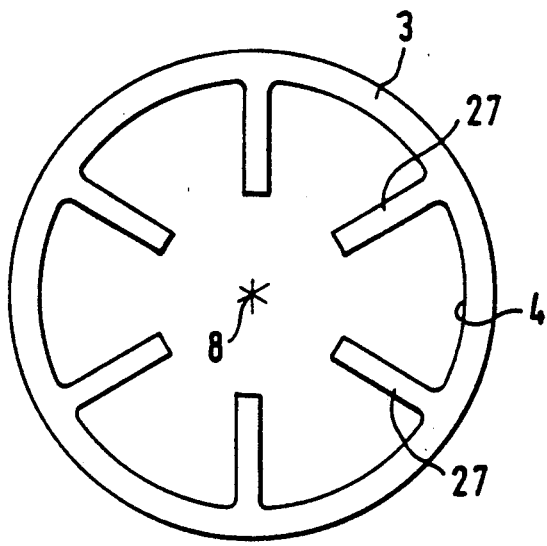
FIG. 18 is another embodiment of the reinforcing of a connection tube in which, however, only reinforcing ribs are provided which project from the interior wall toward the inside.

FIG. 18 shows another embodiment in which, however, only webs 27 which project from the interior wall 4 radially toward the interior are provided in the form of reinforcing ribs. Also this embodiment causes a reinforcement of the connection tube 3, in which case the webs connected with one another in the center cause a still higher stability.

All embodiments may be molded in one piece from plastic material. Care must be taken that the walls of the webs are arranged in parallel, or even better, widening slightly conically toward the outside with respect to one another and with respect to the interior wall 4 of the connection tube 3, so that the core of the tool used for the manufacturing of the plastic radiator tank can easily be pulled out in the direction of the axis 8.

It should also be mentioned that, for example, the embodiment according to FIG. 4 can be utilized in a particularly simple manner for inserting a sealing stopper for testing the tightness of the finished heat exchanger. The reason is that this type of a sealing stopper, by means of a central part, can be slid into the pipe piece 6 and there can be held tight by the radial spreading-open on the interior wall 28 of the pipe piece 6, in which case, at the same time, a part of the sealing stopper with a larger diameter can be placed tightly against the ring surface 29 which remains free in the area of the entry edge 31 of the connection tube 3. Despite the high stability of the connection tube, in the case of all constructions, a subsequent inserting of additional parts, for example, in the form of a reinforcing sleeve, is not necessary. It is also an advantage in this case that a sealing stopper then rests in a direct manner tightly against the interior wall of the connection tube and not against an inserted sleeve which, in turn, may not be leakproof with respect to the connection tube.

The embodiments, which are described for the radiator of a coolant circulating system of a commercial-vehicle engine may also be used for the connection tubes of the air containers of air/air coolers, for example, for charge air coolers of Diesel engines.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A plastic radiator tank for heat exchangers of internal-combustion engines having at least one integrally formed connection tube for a heat exchange medium, said connection tube having an interior wall and including a reinforcement on the interior wall, wherein the reinforcement comprises webs which project toward the inside of the connection tube from the interior wall and provide stiffness for a hose connection to the connection tube.

2. A plastic radiator tank according to claim 1, wherein the webs are injection-molded onto the connection tube.

3. A plastic radiator tank according to claim 1, wherein the webs are reinforcing ribs distributed uniformly on a circumference of the interior wall and extend in the flow direction.

4. A plastic radiator tank according to claim 1, wherein the webs are flow guiding walls connected with one another.

5. A plastic radiator tank according to claim 4, wherein the plastic radiator tank also has a hollow pipe piece and the webs abut on and are connected with the hollow pipe piece.

6. A plastic radiator tank according to claim 5, wherein the pipe piece has a circular-cylindrical construction.

7. A plastic radiator tank according to claim 6, wherein the connection tube is circular with a center axis and the pipe pipe is arrange concentrically to the center axis of the connection tube.

8. A plastic radiator tank according to claim 7, wherein the webs have front edges that, at least in the area of the interior wall of the connection tube, are slightly set back toward the inferior of the connection tube from the entry opening of the connection tube to thereby form a surrounding ring surface.

9. A plastic radiator tank according to claim 5, wherein the pipe piece is eccentrically arranged in the cross-section of the connection tube.

10. A plastic radiator tank according to claim 1, wherein the webs extend radially to a center axis of the connection tube.

11. A plastic radiator tank according to claim 9, wherein the webs extend radially to the center axis of the eccentric pipe piece.

12. A plastic radiator tank according to claim 1, wherein the webs spiral toward the outside from a center axis of the connection tube.

13. A plastic radiator tank according to claim 1, wherein the webs form parts of a honeycomb-shaped reinforcement inside the connection tube.

14. A plastic radiator tank according to claim 1, wherein the webs are reinforcing ribs distributed uniformly on a circumference of the interior wall and extend in the flow direction.

15. A plastic radiator tank according to claim 1, wherein the webs have front edges that, at least in the area of the interior wall of the connection tube, are slightly set back toward the interior of the connection tube from the entry opening of the connection tube to thereby form a surrounding ring surface.

16. A plastic radiator tank according to claim 6, wherein the pipe piece is eccentrically arranged in the cross-section of the connection tube.

17. A plastic radiator tank according to claim 16, wherein the webs extend radially to the center axis of the eccentric pipe piece.

* * * * *